United States Patent
Orihashi et al.

(10) Patent No.: US 12,451,724 B2
(45) Date of Patent: *Oct. 21, 2025

(54) RETENTION AMOUNT MANAGEMENT SYSTEM AND RETENTION AMOUNT MANAGEMENT METHOD

(71) Applicant: TOYOTA JIDOSHA KABUSHIKI KAISHA, Toyota (JP)

(72) Inventors: Nobuyuki Orihashi, Toyota (JP); Shigeki Kinomura, Toyota (JP); Tamaki Ozawa, Toyota (JP); Chiaki Kanda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 955 days.

This patent is subject to a terminal disclaimer.

(21) Appl. No.: 17/573,731

(22) Filed: Jan. 12, 2022

(65) Prior Publication Data
US 2022/0245737 A1 Aug. 4, 2022

(30) Foreign Application Priority Data
Jan. 29, 2021 (JP) .................. 2021-013424

(51) Int. Cl.
*H02J 15/00* (2006.01)
*H02J 3/14* (2006.01)
*H02J 3/32* (2006.01)

(52) U.S. Cl.
CPC ............ *H02J 15/008* (2020.01); *H02J 3/144* (2020.01); *H02J 3/322* (2020.01); *H02J 2300/00* (2020.01); *H02J 2300/40* (2020.01)

(58) Field of Classification Search
CPC .................. H01M 8/22; H02J 15/008
See application file for complete search history.

(56) References Cited

U.S. PATENT DOCUMENTS

2003/0008187 A1* 1/2003 Higashiyama ...... H01M 8/0612
422/105
2008/0121525 A1* 5/2008 Doland .................. C25B 15/08
322/29

(Continued)

FOREIGN PATENT DOCUMENTS

EP         3 950 575 A1    2/2022
JP         2018-148679 A    9/2018

(Continued)

OTHER PUBLICATIONS

Non Final Office Action issued in U.S. Appl. No. 17/572,733, dated Apr. 8, 2025.

*Primary Examiner* — Nathan L Laughlin
(74) *Attorney, Agent, or Firm* — Finnegan, Henderson, Farabow, Garrett, and Dunner, LLP

(57) ABSTRACT

A retention amount management system includes a detector that detects an amount of retention and a server that adjusts an amount of production of hydrogen in a production facility such that the amount of retention of hydrogen retained in a retention facility for a predetermined period attains to a target amount of retention. The server sets the target amount of retention such that an amount of hydrogen α corresponding to an amount of surplus electric power during a preparation period during which electric power generated per prescribed period by using renewable energy is higher than a threshold value is larger than an amount of hydrogen β corresponding to the amount of surplus electric power during an ordinary period.

4 Claims, 5 Drawing Sheets

(56) References Cited

U.S. PATENT DOCUMENTS

| | | | |
|---|---|---|---|
| 2014/0057189 A1* | 2/2014 | Oh | H01M 8/04302 429/429 |
| 2016/0282231 A1* | 9/2016 | Keene | G06Q 10/0639 |
| 2018/0137580 A1 | 5/2018 | Pornmontarut et al. | |
| 2020/0006954 A1 | 1/2020 | Miyata et al. | |
| 2020/0328595 A1 | 10/2020 | Yasuda et al. | |
| 2021/0405603 A1 | 12/2021 | Nagino et al. | |
| 2022/0246958 A1 | 8/2022 | Orihashi et al. | |
| 2023/0147457 A1* | 5/2023 | Kamei | F17C 7/00 700/286 |

FOREIGN PATENT DOCUMENTS

| | | |
|---|---|---|
| JP | 2020-028198 A | 2/2020 |
| WO | WO 2020/203520 A1 | 10/2020 |

\* cited by examiner

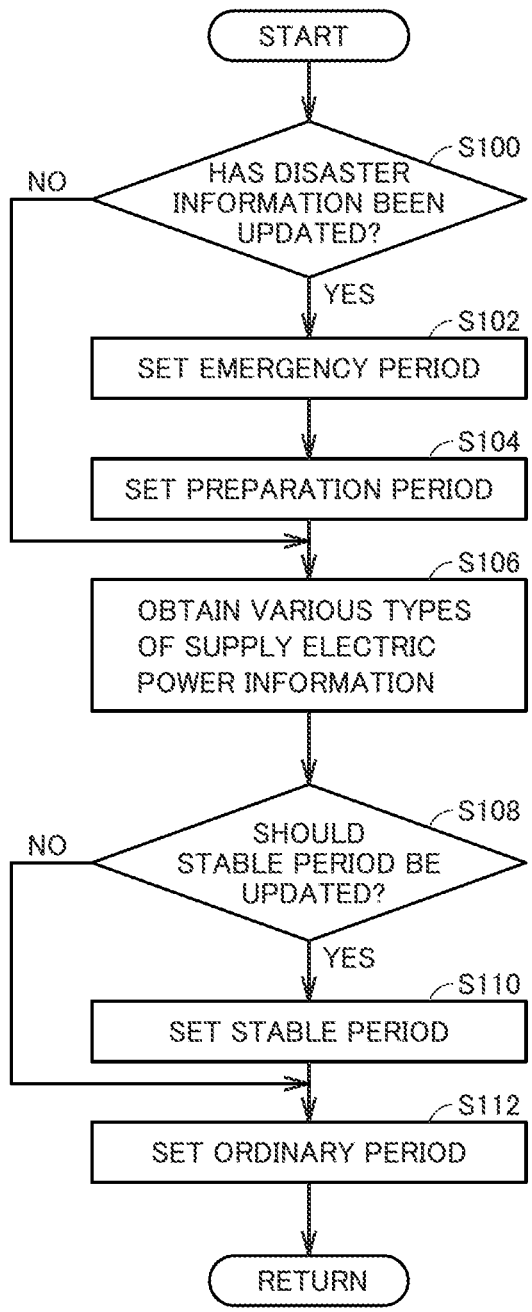

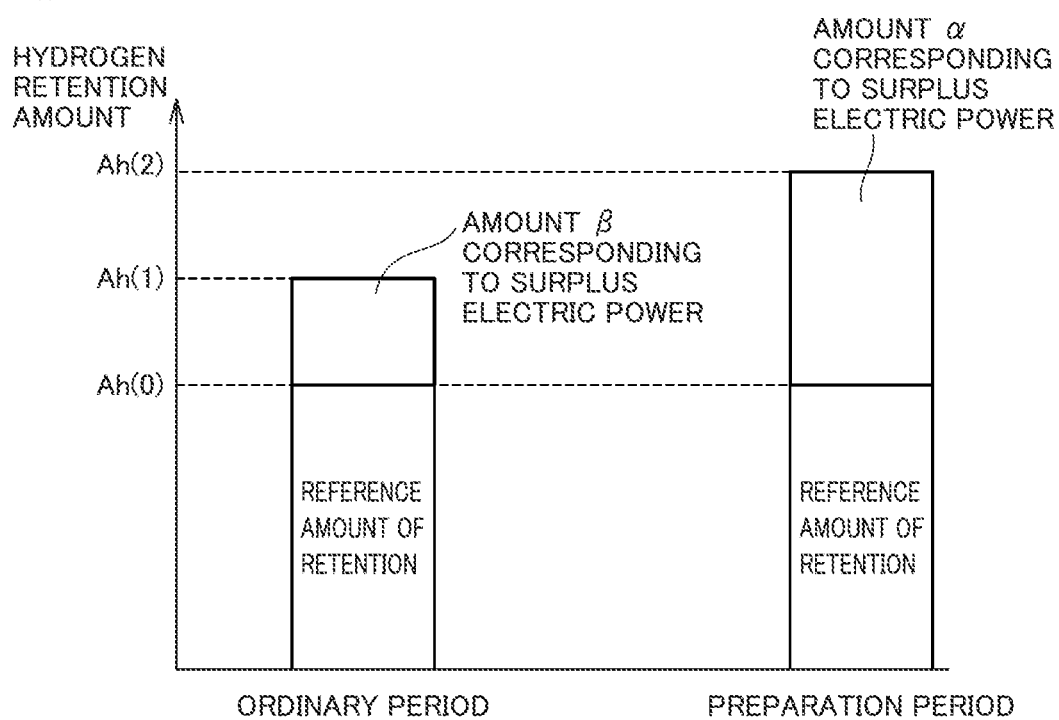

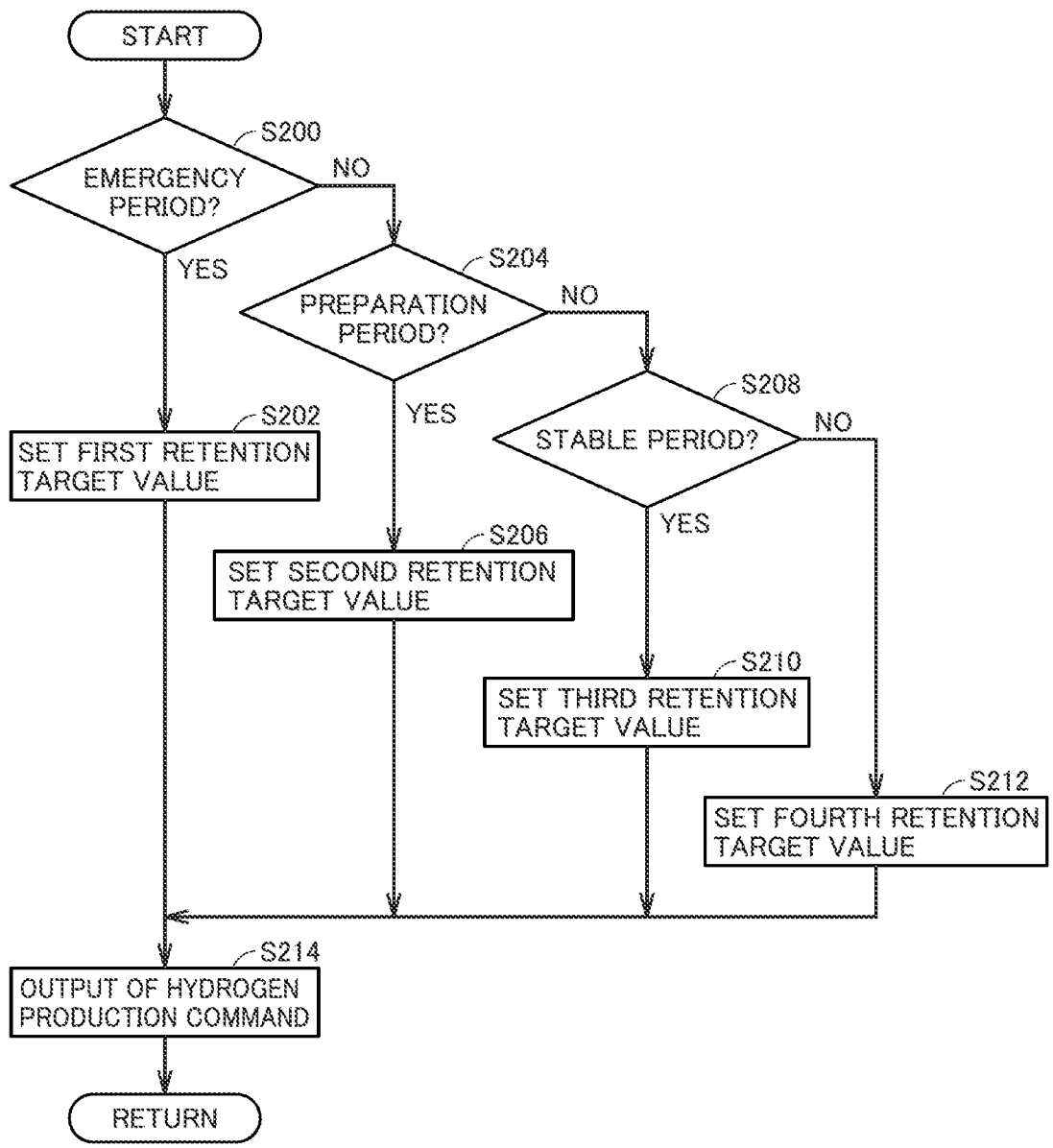

RETENTION AMOUNT MANAGEMENT SYSTEM AND RETENTION AMOUNT MANAGEMENT METHOD

This nonprovisional application is based on Japanese Patent Application No. 2021-013424 filed with the Japan Patent Office on Jan. 29, 2021, the entire contents of which are hereby incorporated by reference.

BACKGROUND

Field

The present disclosure relates to management of an amount of retention of hydrogen retained in a hydrogen retention facility provided in an area where a microgrid is set.

Description of the Background Art

A small-scale power network (a microgrid below) that meets electric power demand from a consumption facility in a specific area by using a power supply facility in the specific area without depending on electric power supply by a large-scale power generation facility has recently attracted attention. The power supply facility in the specific area includes various small-scale distributed power supplies. The distributed power supplies include, for example, not only a power generation facility making use of renewable energy such as solar rays, water power, and wind power but also a stationary power storage, a power storage mounted on an electrically powered vehicle, a stationary fuel cell, or a fuel cell mounted on a fuel cell electric vehicle. Therefore, in the specific area, for example, a hydrogen infrastructure such as a production facility that produces hydrogen that can be supplied to a fuel cell or a retention facility where produced hydrogen is retained is provided, and hydrogen may be retained as surplus electric power. In such a microgrid, when it is disconnected from a power grid outside the specific area, the power supply facility is managed in order to provide electric power in an amount enough for consumption within the specific area.

For example, Japanese Patent Laying-Open No. 2020-28198 discloses a technique to maintain a voltage of a microgrid power system when an external interconnected power system is lost or unstable.

SUMMARY

In the event of a disaster such as a flood damage due to seasonal climate change in a specific area where a microgrid as described above is set or in an area adjacent to the specific area, a state that electric power demand is met by a power supply facility in the specific area while the specific area is disconnected from a power grid outside the specific area may continue. Electric power generated by using renewable energy such as solar rays, water power, or wind power may vary depending on a position or topography of the specific area or on seasons. Therefore, in order to maintain the state that electric power demand is met by the power supply facility in the specific area even in the event of a disaster, an amount of retention of hydrogen retained in a hydrogen infrastructure should appropriately be managed for ensuring surplus electric power in advance.

An object of the present disclosure is to provide a retention amount management system and a retention amount management method that appropriately manage an amount of retention of hydrogen retained in a hydrogen retention facility provided in an area where a microgrid is set.

A retention amount management system according to one aspect of the present disclosure is a retention amount management system that manages an amount of retention of hydrogen in a retention facility where hydrogen is retained, the retention facility being provided in a specific area. A microgrid is set in the specific area. The microgrid includes a consumption facility that consumes electric power and a power supply facility that can supply electric power to the consumption facility. The power supply facility includes a power generation facility that can generate electric power by using renewable energy and a fuel cell that can generate electric power by using hydrogen retained in the retention facility. In the specific area, a production facility that produces hydrogen to be retained in the retention facility by using electric power is provided. The retention amount management system includes an obtaining apparatus that obtains the amount of retention and an adjustment apparatus that adjusts an amount of production of hydrogen in the production facility such that an amount of retention of hydrogen retained in the retention facility for a predetermined period attains to a target amount of retention. The target amount of retention includes a reference amount of retention and an amount of hydrogen corresponding to an amount of surplus electric power in the microgrid. A period within the predetermined period, including a date identical to a date within a period during which frequency of occurrence of a disaster in the past is higher than during other periods is set as an emergency period based on history information on the disaster that occurred in the past. A period within the predetermined period, before the emergency period is set as a preparation period. At least a part of a period within the predetermined period, other than the emergency period and the preparation period is set as an ordinary period. The adjustment apparatus sets the target amount of retention such that a first amount of hydrogen corresponding to the amount of surplus electric power during the preparation period is larger than a second amount of hydrogen corresponding to the amount of surplus electric power during the ordinary period.

During the preparation period, it is required to ensure surplus electric power before the emergency period. Therefore, by setting the target amount of retention such that a first amount of hydrogen corresponding to the amount of surplus electric power during the preparation period is larger than a second amount of hydrogen corresponding to the amount of surplus electric power during the ordinary period, an appropriate amount of hydrogen can be retained in preparation for a disaster.

In one embodiment, the adjustment apparatus sets the target amount of retention such that an amount of hydrogen corresponding to the amount of surplus electric power during the ordinary period is smaller than during other periods.

Thus, the target amount of retention of hydrogen is set such that, during the ordinary period, the amount of hydrogen corresponding to the amount of surplus electric power more than the amount of hydrogen during other periods is not stored. Therefore, increase in electric power consumed for producing hydrogen as the amount of surplus electric power can be suppressed.

Furthermore, in one embodiment, the emergency period includes a period during which occurrence of a disaster in the specific area is anticipated, within the predetermined period.

Thus, a period during which a disaster is highly likely to occur can be set as the emergency period.

A retention amount management method according to another aspect of the present disclosure is a retention amount management method of managing an amount of retention of hydrogen in a retention facility where hydrogen is retained, the retention facility being provided in a specific area. A microgrid is set in the specific area. The microgrid includes a consumption facility that consumes electric power and a power supply facility that can supply electric power to the consumption facility. The power supply facility includes a power generation facility that can generate electric power by using renewable energy and a fuel cell that can generate electric power by using hydrogen retained in the retention facility. In the specific area, a production facility that produces hydrogen to be retained in the retention facility by using electric power is provided. The retention amount management method includes obtaining the amount of retention and adjusting an amount of production of hydrogen in the production facility such that an amount of retention of hydrogen retained in the retention facility for a predetermined period attains to a target amount of retention. The target amount of retention includes a reference amount of retention and an amount of hydrogen corresponding to an amount of surplus electric power in the microgrid. The retention amount management method further includes setting as an emergency period, a period within the predetermined period, including a date identical to a date within a period during which frequency of occurrence of a disaster in the past is higher than during other periods based on history information on the disaster that occurred in the past, setting as a preparation period, a period within the predetermined period, before the emergency period, setting as an ordinary period, at least a part of a period within the predetermined period, other than the emergency period and the preparation period, and setting the target amount of retention such that a first amount of hydrogen corresponding to the amount of surplus electric power during the preparation period is larger than a second amount of hydrogen corresponding to the amount of surplus electric power during the ordinary period.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a flowchart showing exemplary processing for setting various periods performed by a server.

FIG. 4 is a diagram for illustrating an exemplary fourth target amount of retention during an ordinary period and an exemplary second target amount of retention during a preparation period.

FIG. 5 is a flowchart showing exemplary processing for adjusting an amount of retention performed by the server.

DESCRIPTION OF THE PREFERRED EMBODIMENTS

Figure 1:
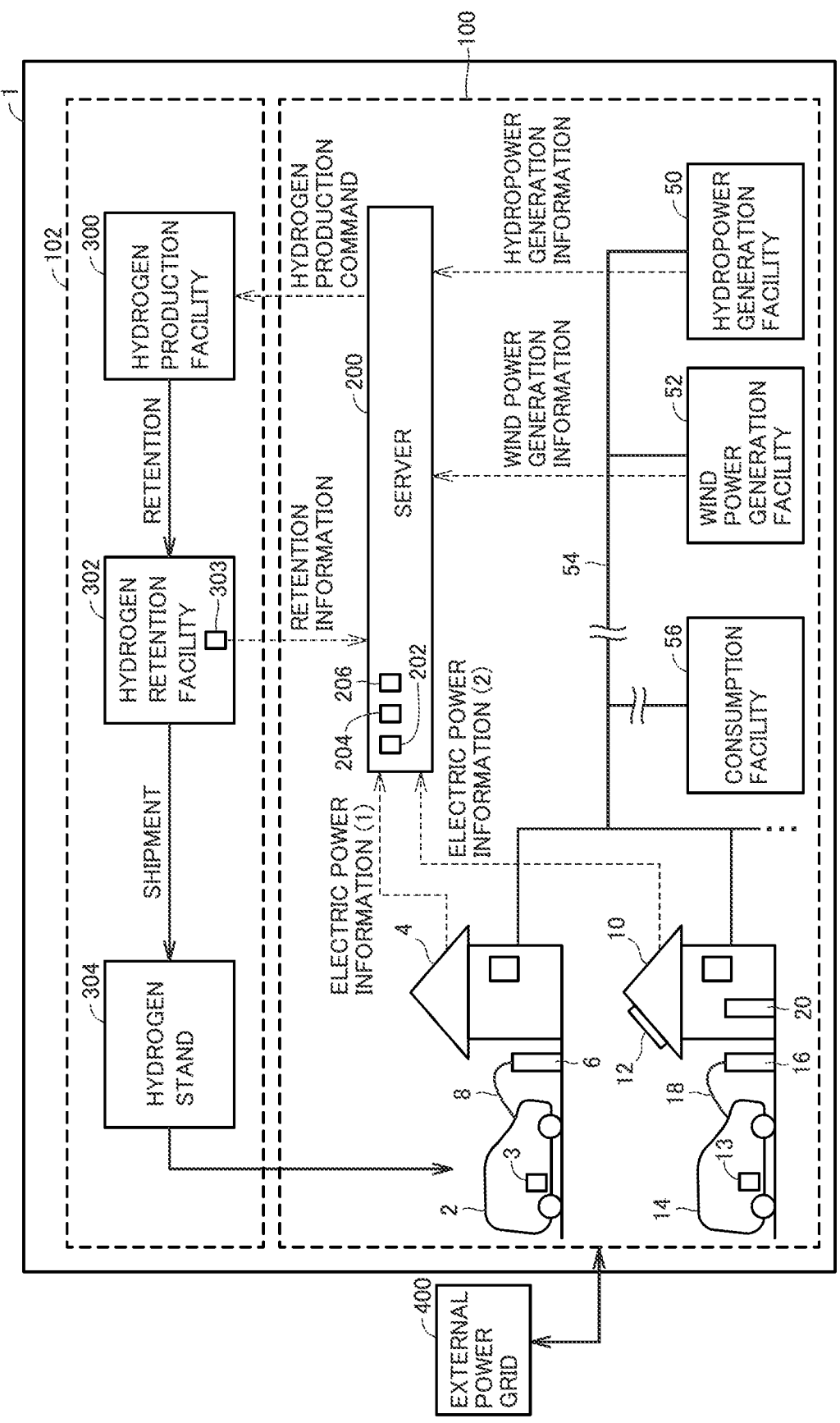
FIG. 1 is a diagram for illustrating an exemplary configuration of each of a hydrogen infrastructure and a microgrid set in a specific area.

An embodiment of the present disclosure will be described in detail below with reference to the drawings. The same or corresponding elements in the drawings have the same reference characters allotted and description thereof will not be repeated.

FIG. 1 is a diagram for illustrating an exemplary configuration of each of a hydrogen infrastructure and a microgrid set in a specific area.

Though a specific area 1 is described, for example, as an area set on the municipality basis, it may be an area set in a part of a municipality or an area set across municipalities. In specific area 1, a microgrid 100 and a hydrogen infrastructure 102 are set.

Microgrid 100 is a small-scale power network that meets electric power demand from a consumption facility in specific area 1 by using a power supply facility in specific area 1 without depending on electric power supply by a large-scale power generation facility. Microgrid 100 supplies and receives electric power, for example, to and from a power grid 400 outside specific area 1 (which may be denoted as an external power grid). Alternatively, microgrid 100 can cut off supply and reception of electric power to and from external power grid 400 by meeting electric power demand from the consumption facility in specific area 1 by supply of electric power from various power supply facilities in specific area 1.

Microgrid 100 includes a power supply facility, a consumption facility, and a server 200. The power supply facility includes a fuel cell electric vehicle 2 connected to a house 4, a photovoltaic power generation apparatus 12 and a stationary power storage 20 provided in a house 10, an electrically powered vehicle 14 connected to house 10, a hydropower generation facility 50, and a wind power generation facility 52.

Fuel cell electric vehicle 2 is a vehicle that incorporates a fuel cell 3 and is capable of feeding power from fuel cell 3 to the outside of the vehicle.

House 4 is connected to fuel cell electric vehicle 2 through a cable 8 with a power stand 6 being interposed. House 4 is connected to a power grid 54. Therefore, for example, electric power can be supplied from fuel cell 3 mounted on fuel cell electric vehicle 2 through cable 8, power stand 6, and a power switchboard (not shown) within house 4 to power grid 54.

When electric power supplied from fuel cell electric vehicle 2 is lower than electric power consumed by an electrical appliance provided in house 4, house 4 is defined as the consumption facility. A plurality of houses 4 as described above may be provided as the power supply facility.

House 4 is provided, for example, with a detector (for example, a smart meter) that detects electric power supplied to and received from power grid 54. The detector transmits a signal representing a result of detection to server 200 as electric power information (1).

House 10 is connected to electrically powered vehicle 14 through a cable 18 with a power stand 16 being interposed. Electrically powered vehicle 14 is a vehicle that incorporates a power storage 13 and is capable of feeding power from power storage 13 to the outside of the vehicle. Electrically powered vehicle 14 is a vehicle in which power storage 13 is chargeable with electric power from power grid 54.

House 10 is further provided with photovoltaic power generation apparatus 12 and stationary power storage 20. House 10 is connected to power grid 54. Therefore, in house 10, for example, electric power can be supplied from photovoltaic power generation apparatus 12 through a power switchboard (not shown) within house 10 to power grid 54. Furthermore, in house 10, for example, electric power can be supplied from stationary power storage 20 through the power switchboard within house 10 to power grid 54. Furthermore, in house 10, electric power can be supplied from power storage 13 mounted on electrically powered vehicle 14 through the power switchboard within the house to power grid 54.

When electric power supplied from photovoltaic power generation apparatus 12, electrically powered vehicle 14, and stationary power storage 20 is lower than electric power consumed by an electrical appliance provided in house 10, house 10 is defined as the consumption facility. A plurality of houses 10 as described above may be provided as the power supply facility.

House 10 is provided, for example, with a detector (for example, a smart meter) that detects electric power supplied to and received from power grid 54. The detector transmits a signal representing a result of detection to server 200 as electric power information (2).

Power grid 54 is further connected to each of hydropower generation facility 50 and wind power generation facility 52. Hydropower generation facility 50 is provided, for example, in a dam provided on a river. Hydropower generation facility 50 generates electric power by rotating a turbine by using power of a water current (water power) that flows in the dam. Hydropower generation facility 50 is provided with a detector (not shown) that detects generated electric power. The detector transmits a signal representing a result of detection to server 200 as hydropower generation information.

Wind power generation facility 52 is provided at a prescribed position in specific area 1. Wind power generation facility 52 generates electric power by rotating a propeller by using wind power. Wind power generation facility 52 is provided with a detector that detects generated electric power. The detector transmits a signal representing a result of detection to server 200 as wind power generation information.

Consumption facility 56 includes various facilities that consume electric power such as various buildings including factories and various lighting facilities including streetlights.

Server 200 is a computer that manages demand and supply of electric power within microgrid 100 and manages supply and reception of electric power to and from external power grid 400. Server 200 includes a central processing unit (CPU) 202 that allows processing by a program, a memory 204 configured with a random access memory (RAM) or a read only memory (ROM), and a communication apparatus 206. Not only a program but also information (for example, a map, a mathematical expression, or various parameters) used by a program is stored in memory 204. Communication apparatus 206 is configured to communicate with house 4, house 10, hydropower generation facility 50, and wind power generation facility 52 within microgrid 100 through wireless or wired communication. Furthermore, communication apparatus 206 is configured to communicate with a hydrogen production facility 300 and a hydrogen retention facility 302 in specific area 1 through wireless or wired communication. Communication apparatus 206 may be configured to communicate with fuel cell electric vehicle 2 or electrically powered vehicle 14 through wireless communication.

Server 200 receives electric power information (1) from house 4 by means of communication apparatus 206. Electric power information (1) may include, for example, information on electric power supplied from fuel cell electric vehicle 2 to power grid 54 in addition to electric power supplied and received between house 4 and power grid 54.

Server 200 further receives electric power information (2) from house 10 by means of communication apparatus 206. Electric power information (2) may include, for example, information on electric power supplied from photovoltaic power generation apparatus 12 to power grid 54, information on electric power supplied from electrically powered vehicle 14 to power grid 54, and information on electric power supplied from stationary power storage 20 to power grid 54, in addition to electric power supplied and received between house 10 and power grid 54.

Server 200 further receives hydropower generation information from hydropower generation facility 50 and wind power generation information from wind power generation facility 52 by means of communication apparatus 206.

Server 200 adjusts electric power generated in the power supply facility such as fuel cell electric vehicle 2, photovoltaic power generation apparatus 12, electrically powered vehicle 14, stationary power storage 20, hydropower generation facility 50, and wind power generation facility 52 so as to provide electric power to be consumed in consumption facility 56. For example, server 200 predicts an amount of demand for electric power based on power consumption history in the past and adjusts generated electric power such that a predicted amount of demanded electric power is supplied from the power supply facility. For example, server 200 monitors electric power generated by photovoltaic power generation apparatus 12, hydropower generation facility 50, and wind power generation facility 52. Server 200 requests house 4 or house 10 to supply from fuel cell electric vehicle 2, electrically powered vehicle 14, and stationary power storage 20, electric power for covering shortfall. As supply of electric power is permitted in house 4 or house 10 in response to the request from server 200 on condition that a certain incentive is paid, electric power is supplied from fuel cell electric vehicle 2, electrically powered vehicle 14, or stationary power storage 20 to power grid 54. Electric power demand from consumption facility 56 in microgrid 100 can thus be met by electric power supplied from various power supply facilities without depending on external power grid 400. When electric power supplied from various power supply facilities is insufficient, demand and supply of electric power within microgrid 100 can appropriately be managed by receiving supply of electric power from external power grid 400 or requesting consumption facility 56 to reduce demand.

Information on timing of occurrence of disasters in the past in specific area 1 is stored in memory 204 of server 200. The information on timing of occurrence of disasters in the past in specific area 1 includes, for example, information on timing (date) of observation of an amount of rainfall equal to or larger than a certain amount. The information on timing of occurrence of disasters in the past in specific area 1 may be, for example, information entered by a user by using an input apparatus. Alternatively, information on timing of observation of an amount of rainfall equal to or larger than a certain amount in specific area 1 may be extracted and obtained from an external server (not shown) where meteorological data of each location (data in which a location, a date, and an amount of rainfall are associated with one another) is stored.

Server 200 sets an emergency period, a preparation period, a stable period, and an ordinary period within a predetermined period, based on the information on timing of occurrence of disasters in the past and various types of information received from the power supply facilities within microgrid 100. The predetermined period is set, for example, to one year.

Figure 2:
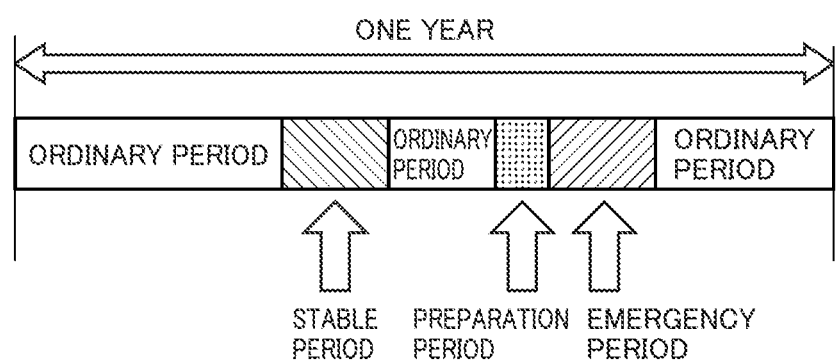
FIG. 2 is a diagram for illustrating exemplary various periods.

FIG. 2 is a diagram for illustrating exemplary various periods. As shown in FIG. 2, server 200 sets the emergency period, the preparation period, the stable period, and the ordinary period each time a predetermined period elapses and updates various periods.

Specifically, server 200 sets as the emergency period, a period within the predetermined period, including a date the same as a date within a period during which frequency of occurrence of disasters in the past is higher than during other periods, based on history information on the disasters that occurred in the past.

Server 200 sets as the preparation period, a period within the predetermined period, before the emergency period. In the present embodiment, server 200 sets as the preparation period, a predetermined period immediately preceding the emergency period. The preparation period is set, for example, to a period during which an amount of retention of hydrogen in hydrogen retention facility 302 which will be described later can be increased to a target amount of retention by the time point of start of the emergency period.

Server 200 sets as the stable period, a period during which electric power generated per prescribed period by using renewable energy is higher than a threshold value, the stable period being a period within the predetermined period other than the emergency period and the preparation period. In the present embodiment, for example, server 200 sets as the stable period, a period during which electric power generated by hydropower generation facility 50 per prescribed period is higher than a threshold value.

Server 200 may obtain a daily average value of generated electric power for one recent year and set as the stable period, a period during which the obtained average value is larger than a threshold value, or may obtain a daily average value of generated electric power for several years in the past, obtain a period during which the obtained average value is larger than a threshold value for each year, and set start and end of the stable period with a weight being increased as a time point is closer to the current time point.

Server 200 sets as the ordinary period, a period within the predetermined period, other than the emergency period, the preparation period, and the stable period.

Hydrogen infrastructure 102 includes hydrogen production facility 300, hydrogen retention facility 302, and a hydrogen stand 304.

Hydrogen production facility 300 produces hydrogen with the use of electric power. Hydrogen production facility 300 sends produced hydrogen to hydrogen retention facility 302. Hydrogen production facility 300 is configured to adjust an amount of production based on a hydrogen production command from server 200.

Hydrogen production facility 300 produces hydrogen of prescribed purity, for example, with a prescribed production method (for example, steam reforming, partial oxidation reforming, or reforming by using both of them) by using manufactured gas or liquefied petroleum gas (LPG) as a source material. Alternatively, hydrogen production facility 300 may produce hydrogen, for example, by using sewage biogas generated in a process of treatment in a sewage treatment plant or biomass fuel such as raw garbage as a source material. Alternatively, hydrogen production facility 300 may produce hydrogen by electrolyzing water.

Hydrogen produced in hydrogen production facility 300 is stored in hydrogen retention facility 302. In hydrogen retention facility 302, for example, hydrogen produced in hydrogen production facility 300 is liquefied, and liquefied hydrogen is retained in a retention space such as a tank. In hydrogen retention facility 302, an amount of retained hydrogen (amount of retention) is detected by a detector 303 and information on the amount of retention is transmitted to server 200 as retention information. In hydrogen retention facility 302, for example, gaseous hydrogen may be caused to react with another liquid and retained in a room-temperature state. A known technique should only be used as a technique for retaining hydrogen in the room-temperature state, and limitation to the method described above is not particularly intended. Hydrogen retained in hydrogen retention facility 302 is shipped, for example, to hydrogen stand 304 by using a hydrogen carrier. Hydrogen stand 304 can provide hydrogen, for example, to fuel cell electric vehicle 2.

Hydrogen produced in specific area 1 can thus be a source of electric power by using fuel cell electric vehicle 2. Therefore, by retaining hydrogen corresponding to surplus electric power in hydrogen retention facility 302, electric power demand within microgrid 100 can be met in the event of a disaster.

Server 200 adjusts an amount of production of hydrogen produced in hydrogen production facility 300, for example, such that the amount of retention of hydrogen retained in hydrogen retention facility 302 attains to a target amount of retention. Thus, even when a state that microgrid 100 is disconnected from external power grid 400 due to a disaster or the like continues, electric power demand from consumption facility 56 in specific area 1 can be met by a power supply facility within specific area 1.

In the configuration of microgrid 100 and hydrogen infrastructure 102 configured as above, in the event of a disaster such as a flood damage due to seasonal climate change in specific area 1 or in an area adjacent to specific area 1, a state that electric power demand is met by a power supply facility in specific area 1 while specific area 1 is disconnected from external power grid 400 may continue. Electric power generated by using renewable energy such as solar rays, water power, or wind power may vary depending on a position or topography of specific area 1 or on seasons. Therefore, in order to maintain the state that electric power demand is met by the power supply facility in the specific area even in the event of the disaster, an amount of retention of hydrogen retained in hydrogen infrastructure 102 should appropriately be managed for ensuring surplus electric power in advance.

In the present embodiment, server 200 sets a target amount of retention such that a first amount of hydrogen corresponding to an amount of surplus electric power during the preparation period is larger than a second amount of hydrogen corresponding to the amount of surplus electric power during the ordinary period.

During the preparation period, it is required to ensure surplus electric power before the emergency period. Therefore, by setting the target amount of retention such that a first amount of hydrogen corresponding to the amount of surplus electric power during the preparation period is larger than a second amount of hydrogen corresponding to the amount of surplus electric power during the ordinary period, an appropriate amount of hydrogen can be retained in preparation for a disaster.

Processing for setting various periods performed by server 200 will be described below with reference to FIG. 3. FIG. 3 is a flowchart showing exemplary processing for setting various periods performed by server 200.

In step (a step being denoted as S below) 100, server 200 determines whether or not disaster history information has been updated. For example, when timing of update at which the disaster history information is to be updated has passed, server 200 may determine that the disaster history information has been changed. Alternatively, when contents in the disaster history information or a date of update of the disaster history information stored in memory 204 have/has been updated, server 200 may determine that the disaster history information has been updated. Alternatively, when server 200 receives the disaster history information from an external server, it may determine that the disaster history information has been updated. When it is determined that the disaster history information has been updated (YES in S100), the process proceeds to S102. When it is determined that the disaster history information has not been updated (NO in S100), the process proceeds to S106.

In S102, server 200 sets the emergency period. Server 200 sets as the emergency period, for example, a period including timing of occurrence of a disaster in the past based on the updated disaster history information. Though an example in which server 200 sets one emergency period within a predetermined period (one year) is described by way of example in the present embodiment, a plurality of periods may be set as the emergency periods. The emergency period may be set, for example, by the month, the week, or the day. When the disaster history information includes information on occurrence of disasters such as damages, the number of victims, or the number of disaster-affected buildings exceeding a certain range on a specific date in the past, for example, server 200 sets as the emergency period, a prescribed period including a date (or a period including the same start and end dates) the same as the specific date (or period) including timing (or a period) of occurrence of the disasters. Server 200 sets as the start of the emergency period, for example, a date preceding the date of occurrence of damages caused by a disaster (or the start of a period of occurrence of damages caused by the disaster) by a certain period (for example, approximately several days), and sets as the end of the emergency period, a date after lapse of a certain period (for example, approximately several days) since the date of occurrence of damages caused by the disaster (or the end of the period of occurrence of damages caused by the disaster).

In S104, server 200 sets the preparation period. Server 200 sets the preparation period by setting a time point preceding the start of the emergency period by a prescribed period as the start of the preparation period and setting the start of the emergency period as the end of the preparation period. The preparation period is a period during which the amount of surplus electric power is increased in preparation for the emergency period, that is required to increase the amount of retention of hydrogen to the target amount of retention. Server 200 calculates a period required to increase the amount of retention of hydrogen to the target amount of retention, for example, based on a predicted value of the amount of retention at the time of start of the preparation period and an upper limit value of an amount of production of hydrogen per unit time, and sets a period calculated by adding a certain margin as the preparation period.

Though server 200 is described as setting a period immediately preceding the emergency period as the preparation period in the present embodiment, the preparation period should only precede the emergency period and is not particularly limited to the immediately preceding period. When a plurality of emergency periods are set, a plurality of preparation periods may be set for respective emergency periods.

In S106, server 200 obtains various types of supply electric power information. Various types of supply electric power information include electric power information (1), electric power information (2), the hydropower generation information, and the wind power generation information. Server 200 has the obtained various types of supply electric power information stored in memory 204.

In S108, server 200 determines whether or not the stable period should be updated. For example, when timing of update of the stable period has passed, server 200 may determine that the stable period should be updated. Alternatively, when a first period during which an average value of electric power generated per prescribed period (for example, per one day) within one most recent year exceeds a threshold value greatly deviates from a second period currently set as the stable period, server 200 may determine that the stable period should be updated. For example, when the first period and the second period do not overlap with each other, when start of the first period and start of the second period deviate from each other by a prescribed period or longer, when the end of the first period and the end of the second period deviate from each other by a prescribed period or longer, or when a difference between a length of the first period and a length of the second period is equal to or larger than a threshold value, server 200 may determine that the first period and the second period greatly deviate from each other. When it is determined that the stable period should be updated (YES in S108), the process proceeds to S110. When it is determined that the stable period does not have to be updated (NO in S108), this process ends.

In S110, server 200 sets the stable period. Since the method of setting the stable period is as described above, detailed description thereof will not be repeated.

In S112, server 200 sets the ordinary period. For example, server 200 sets as the ordinary period, a period within the predetermined period except for the emergency period, the preparation period, and the stable period.

Server 200 sets the target amount of retention in accordance with a type of the current period. The target amount of retention includes, for example, a value of an amount of retention defined as the reference (a reference amount of retention) and an amount of hydrogen corresponding to surplus electric power.

The reference amount of retention is set, for example, based on history of an amount of consumption of hydrogen in specific area 1. The same value may be set for a predetermined period, or a value different for each month, week, or day may be set. For example, a value in accordance with each of the emergency period, the preparation period, the stable period, and the ordinary period is set as the amount of hydrogen corresponding to surplus electric power. Therefore, when the current period falls under the emergency period, server 200 sets a first target amount of retention as the target amount of retention.

When the current period falls under the preparation period, server 200 sets a second target amount of retention as the target amount of retention. Server 200 may set, for example, an upper limit value of the amount of hydrogen that can be retained in hydrogen retention facility 302 as the second target amount of retention during the preparation period.

When the current period falls under the stable period, server 200 sets a third target amount of retention as the target amount of retention. When the current period falls under the ordinary period, server 200 sets a fourth target amount of retention as the target amount of retention. The fourth target amount of retention is smaller than the first target amount of retention, the second target amount of retention, and the third target amount of retention.

In the present embodiment, an amount of retention of hydrogen $\alpha$ corresponding to surplus electric power during the preparation period is set to be larger than an amount of retention of hydrogen β corresponding to surplus electric power during the ordinary period.

FIG. 4 is a diagram for illustrating an exemplary fourth target amount of retention during the ordinary period and an exemplary second target amount of retention during the preparation period. FIG. 4 shows on the left, the fourth target amount of retention during the ordinary period in a bar graph. FIG. 4 shows on the right, the second target amount of retention during the preparation period in a bar graph. The ordinate in FIG. 4 represents an amount of retention of hydrogen. For example, a case where the reference amount of retention is set to a value Ah(0) equal between the ordinary period and the preparation period is assumed.

As shown in the bar graph on the left in FIG. 4, the fourth target amount of retention during the ordinary period is set to a value Ah(1) calculated by addition of amount of hydrogen β corresponding to surplus electric power to reference amount of retention Ah(0). As shown in the bar graph on the right in FIG. 4, the second target amount of retention during the preparation period is set to a value Ah(2) calculated by adding amount of hydrogen α corresponding to surplus electric power to reference amount of retention Ah(0). Since amount of hydrogen α corresponding to surplus electric power is larger than amount of hydrogen β, second target amount of retention Ah(2) is larger than fourth target amount of retention Ah(1).

Exemplary processing for output of a hydrogen production command to hydrogen production facility 300 so as to achieve the target amount of retention set in accordance with various periods will now be described with reference to FIG. 5. FIG. 5 is a flowchart showing exemplary processing for adjusting an amount of retention performed by server 200.

In S200, server 200 determines whether or not the current time point is within the emergency period. Server 200 communicates with a time counter or an external server to obtain the current date. When the obtained current date is a date within the emergency period, server 200 determines that the current time point is within the emergency period. When it is determined that the current time point is within the emergency period (YES in S200), the process proceeds to S202. When it is determined that the current time point is not within the emergency period (NO in S200), the process proceeds to S204.

In S202, server 200 sets the first target amount of retention corresponding to the emergency period as the target amount of retention. Server 200 thereafter has the process proceed to S214.

In S204, server 200 determines whether or not the current time point is within the preparation period. When the obtained current date is a date within the preparation period, server 200 determines that the current time point is within the preparation period. When it is determined that the current time point is within the preparation period (YES in S204), the process proceeds to S206. When it is determined that the current time point is not within the preparation period (NO in S204), the process proceeds to S208.

In S206, server 200 sets the second target amount of retention corresponding to the preparation period as the target amount of retention. Server 200 thereafter has the process proceed to S214.

In S208, server 200 determines whether or not the current time point is within the stable period. When the obtained current date is a date within the stable period, server 200 determines that the current time point is within the stable period. When it is determined that the current time point is within the stable period (YES in S208), the process proceeds to S210. When it is determined that the current time point is not within the stable period (NO in S208), the process proceeds to S212.

In S210, server 200 sets the third target amount of retention corresponding to the stable period as the target amount of retention. Server 200 thereafter has the process proceed to S214.

In S212, server 200 sets the fourth target amount of retention corresponding to the ordinary period as the target amount of retention. Server 200 thereafter has the process proceed to S214.

In S214, server 200 provides a hydrogen production command to hydrogen production facility 300. Server 200 obtains the current amount of retention from hydrogen retention facility 302. When the obtained current amount of retention is smaller than the set target amount of retention, server 200 generates the hydrogen production command such that hydrogen is produced in an amount in accordance with magnitude of a difference between the current amount of retention and the target amount of retention. Alternatively, when the current amount of retention is larger than the set target amount of retention, server 200 does not generate the hydrogen production command or generates the hydrogen production command not to generate hydrogen.

Operations of server 200 based on the structure and the flowcharts as above will be described below. For example, a case that timing to update the disaster history information has passed is assumed.

In this case, it is determined that disaster history information has been updated (YES in S100). Therefore, the emergency period is set (S102) and a prescribed period immediately preceding the emergency period is set as the preparation period (S104). Furthermore, various types of supply electric power information are obtained (S106). When it is determined that the stable period should be updated (YES in S108), the stable period is set (S110) and the ordinary period is set (S112).

Therefore, when the current date is within the emergency period (YES in S200), the first target amount of retention is set as the target amount of retention (S202), and the hydrogen production command in accordance with the set target amount of retention is provided to hydrogen production facility 300 (S214).

When the current date is not within the emergency period (NO in S200) but within the preparation period (YES in S204), the second target amount of retention is set as the target amount of retention (S206) and the hydrogen production command in accordance with the set target amount of retention is provided to hydrogen production facility 300 (S214).

When the current date is not within the preparation period (NO in S204) but within the stable period (YES in S208), the third target amount of retention is set as the target amount of retention (S210) and the hydrogen production command in accordance with the set target amount of retention is provided to hydrogen production facility 300 (S214).

When the current date is not within the stable period but within the ordinary period (NO in S208), the fourth target amount of retention is set as the target amount of retention (S212) and the hydrogen production command in accordance with the set target amount of retention is provided to hydrogen production facility 300 (S214).

Therefore, since the target amount of retention is set such that amount of hydrogen α corresponding to surplus electric power during the preparation period is larger than amount of hydrogen β corresponding to surplus electric power during the ordinary period, a larger amount of hydrogen as surplus electric power is stored during the preparation period than during the ordinary period.

As set forth above, according to the retention amount management system and the retention amount management method in the present embodiment, during the preparation period, it is required to ensure surplus electric power before the emergency period. By setting the target amount of retention such that a first amount of hydrogen corresponding to the amount of surplus electric power during the preparation period is larger than a second amount of hydrogen corresponding to the amount of surplus electric power during the ordinary period, an appropriate amount of hydrogen can be retained in preparation for a disaster. Therefore, the retention amount management system and the retention amount management method that appropriately manage the amount of retention of hydrogen retained in a hydrogen retention facility provided in an area where a microgrid is set can be provided.

The fourth target amount of retention during the ordinary period is smaller than the first target amount of retention, the second target amount of retention, and the third target amount of retention. Therefore, by setting an amount of hydrogen corresponding to an amount of surplus electric power during the ordinary period to be smaller than that during other periods, increase in electric power consumed by hydrogen production facility 300 is suppressed.

A modification will be described below.

In the embodiment described above, the emergency period is described as being set based on the disaster history information. The emergency period may be set or adjustment such as extension or modification of the set emergency period may be made based on weather forecast information in addition to the disaster history information. The weather forecast information includes, for example, expected timing of rainfall in specific area 1 based on an anticipated course of a typhoon. Server 200 may set again the emergency period, for example, to include expected timing of rainfall therein.

In the embodiment described above, though fuel cell electric vehicle 2 being capable of traveling by receiving supply of electric power from a fuel cell is described by way of example, a vehicle only capable of external power feed by using a fuel cell or a stationary fuel cell may be applicable.

In the embodiment described above, though use of hydrogen produced by hydrogen production facility 300 in fuel cell 3 mounted on fuel cell electric vehicle 2 is described by way of example, hydrogen may be used in a stationary fuel cell in addition to or instead of fuel cell 3.

In the embodiment described above, though a period during which electric power generated per prescribed period by hydropower generation facility 50 is higher than a threshold value is described as being set as the stable period, a period during which electric power generated per prescribed period by photovoltaic power generation apparatus 12 is higher than a threshold value may be set as the stable period, or a period during which electric power generated per prescribed period by wind power generation facility 52 is higher than a threshold value may be set as the stable period. Alternatively, a period during which the sum of electric power generated per prescribed period by photovoltaic power generation apparatus 12, electric power generated per prescribed period by hydropower generation facility 50, and electric power generated per prescribed period by wind power generation facility 52 is higher than a threshold value may be set as the stable period.

In the embodiment described above, though the emergency period is described as being set based on the disaster history information and the stable period is described as being set based on power generation history, the emergency period may be set, for example, based on timing of occurrence of a disaster anticipated by artificial intelligence (AI) learning or the stable period may be set based on anticipation of variation in generated electric power by AI learning.

In the embodiment described above, though at least a part of the period within the predetermined period other than the emergency period and the preparation period (that is, the period further except for the stable period) is described as being set as the ordinary period, the stable period does not have to be set and the entire period other than the emergency period and the preparation period may be set as the ordinary period.

The entirety or a part of the modification may be carried out as being combined as appropriate.

Though an embodiment of the present disclosure is described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A retention amount management system that manages an amount of retention of hydrogen in a retention facility where hydrogen is retained, the retention facility being provided in a specific area, a microgrid being set in the specific area, the microgrid including a consumption facility that consumes electric power and a power supply facility that can supply electric power to the consumption facility, the power supply facility including a power generation facility that can generate electric power by using renewable energy and a fuel cell that can generate electric power by using hydrogen retained in the retention facility, a production facility that produces the hydrogen to be retained in the retention facility by using electric power being provided in the specific area, the retention amount management system comprising:

an obtaining apparatus that obtains the amount of retention; and an adjustment apparatus that adjusts an amount of production of the hydrogen in the production facility such that an amount of retention of the hydrogen retained in the retention facility for a predetermined period attains to a target amount of retention, wherein the target amount of retention includes a reference amount of retention and an amount of hydrogen corresponding to an amount of surplus electric power in the microgrid, a period within the predetermined period, anticipating which frequency of occurrence of a disaster is higher than during other periods is set as an emergency period based on history information on the disaster that occurred in the past, a period within the predetermined period, before the emergency period is set as a preparation period, at least a part of a period within the predetermined period, other than the emergency period and the preparation period is set as an ordinary period, and the adjustment apparatus sets the target amount of retention such that a first amount of hydrogen corresponding to the amount of surplus electric power during the preparation period is larger than a second amount of hydrogen corresponding to the amount of surplus electric power during the ordinary period.

2. The retention amount management system according to claim 1, wherein
the adjustment apparatus sets the target amount of retention such that an amount of hydrogen corresponding to the amount of surplus electric power during the ordinary period is smaller than during other periods.

3. The retention amount management system according to claim 1, wherein
the emergency period includes a period within which occurrence of a disaster in the specific area is anticipated, within the predetermined period.

4. A retention amount management method of managing an amount of retention of hydrogen in a retention facility where hydrogen is retained, the retention facility being provided in a specific area, a microgrid being set in the specific area, the microgrid including a consumption facility that consumes electric power and a power supply facility that can supply electric power to the consumption facility, the power supply facility including a power generation facility that can generate electric power by using renewable energy and a fuel cell that can generate electric power by using hydrogen retained in the retention facility, a production facility that produces the hydrogen to be retained in the retention facility by using electric power being provided in the specific area, the retention amount management method comprising:
obtaining the amount of retention;
adjusting an amount of production of the hydrogen in the production facility such that an amount of retention of the hydrogen retained in the retention facility for a predetermined period attains to a target amount of retention,
the target amount of retention including a reference amount of retention and an amount of hydrogen corresponding to an amount of surplus electric power in the microgrid;
setting as an emergency period, a period within the predetermined period, anticipating which frequency of occurrence of a disaster in past is higher than during other periods, based on history information on the disaster that occurred in the past;
setting as a preparation period, a period within the predetermined period, before the emergency period;
setting as an ordinary period, at least a part of a period within the predetermined period, other than the emergency period and the preparation period; and
setting the target amount of retention such that a first amount of hydrogen corresponding to the amount of surplus electric power during the preparation period is larger than a second amount of hydrogen corresponding to the amount of surplus electric power during the ordinary period.

* * * * *